Patented Dec. 10, 1940

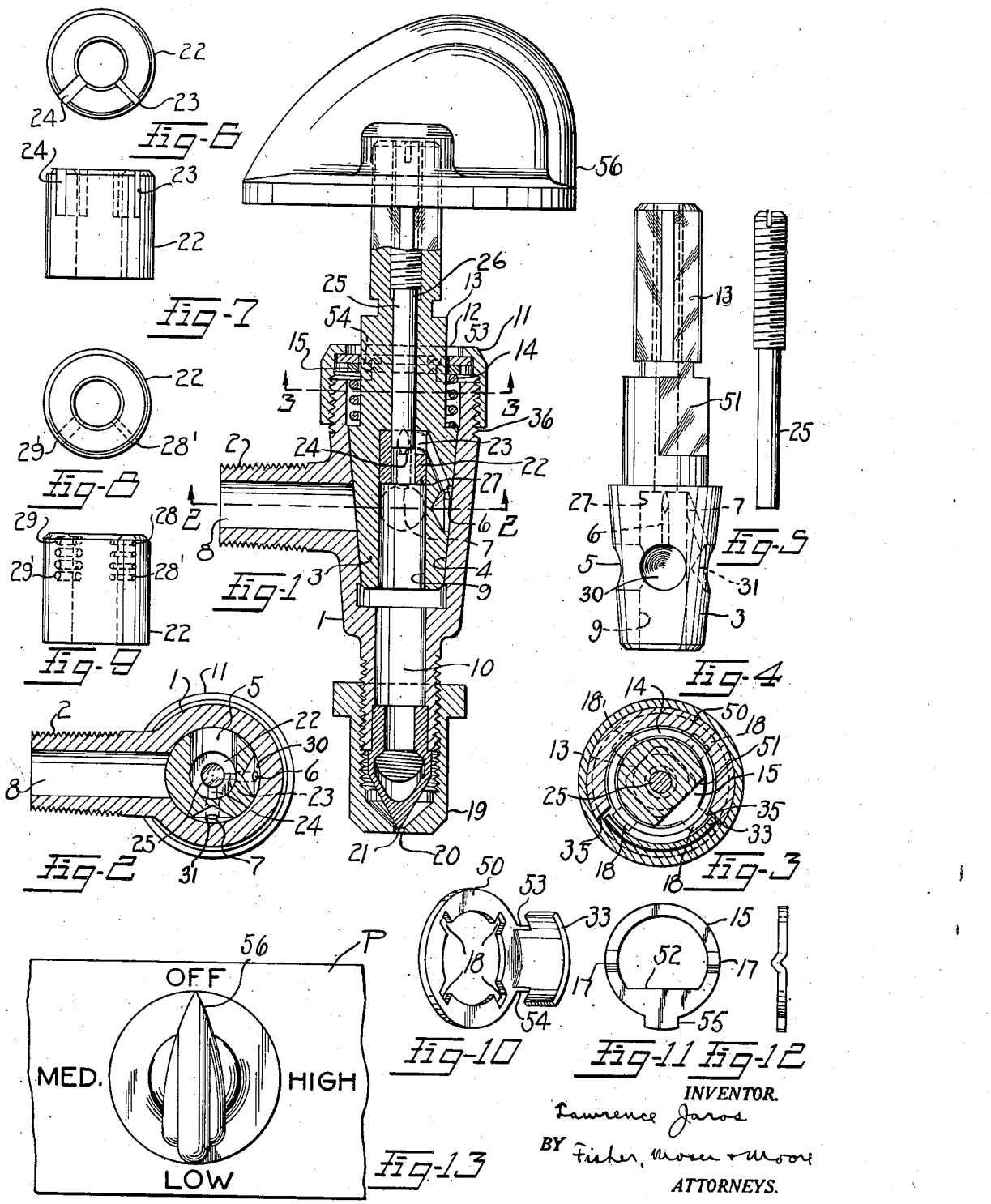

2,224,566

UNITED STATES PATENT OFFICE 2,224,566

VALVE

Lawrence Jaros, Chagrin Falls, Ohio, assignor to The W. J. Schoenberger Company, Cleveland, Ohio, a corporation of Ohio Application April 5, 1939, Serial No. 266,186

7 Claims. (Cl. 277—56)

My invention relates to valves for gas stoves and similar cooking and heating appliances and more particularly relates to the single outlet type of valves having a plurality of flow positions, for example, full flow, low and medium flow.

Heretofore with this type of valve the volume of flow in the various reduced flow positions has generally been obtained by means of needle valves, one being required for each such flow. As this necessitates several adjustments and greatly complicates the valve structure, the number of adjustments being limited only by the number of reduced flow positions, generally speaking the number of reduced flow positions is limited to one, such valve being known as a "high-low" valve. Furthermore due to the fact that the individual adjustment for one flow position is entirely independent of the adjustment for the others, it is practically impossible to maintain the desired relative rate of or proportional flow between the several reduced flows. Also due to the type, design and location of the reduced flow adjustments heretofore used it has been practically impossible to design a modern range with the reduced flow adjustments readily accessible and with the valves easy to assemble to the modern range manifold, this being true even in the case where only a single reduced flow adjustment means is used.

The principal object of the present invention is to provide a valve having a plurality of fixed flow positions with a single throttling or adjusting means for proportionately adjusting the flow in the several reduced flow positions.

A further object of the invention is to provide a valve having a plurality of fixed inlet flow passages of different flow capacities, and a common outlet passage, with a single means for simultaneously and proportionately adjusting the flow capacities of said inlet passages.

Other objects and advantages of the invention will be apparent as the description is considered with the accompanying drawing, in which:

Figure 1 is a longitudinal sectional view taken through the improved valve;

Figure 2 is a section on the line 2—2 of Figure 1;

Figure 3 is a section taken on the line 3—3 of Figure 1;

Figure 4 is a perspective view of the valve plug;

Figure 5 is a side view of the threaded throttle valve;

Figure 6 is a view of the inner end of the hollow insert member;

Figure 7 is a side view of same;

Figure 8 is a view looking at the outer end of the hollow insert member;

Figure 9 is a side view of a modified form of hollow insert member;

Figure 10 is a bottom perspective of the latch and stop member;

Figure 11 is a top plan of the stop and latch member;

Figure 12 is an edge view of the stop and latch washer; and

Figure 13 is a fragmentary view of the front plate or panel of a stove with the improved valve installed thereon.

Referring more particularly to the drawing, the valve body or casing 1 has the inlet extension 2, adapted for connection with a manifold or other suitable source of gas supply not shown. In the particular embodiment of the invention disclosed the extension 2 threads into the gas manifold from the bottom. A rotatable valve plug 3 for controlling the flow of gas through the casing seats within the tapered bore 4. The valve 3 is formed with three inlet passages, a large or full flow passage 5, and smaller reduced flow passages 6 and 7 respectively adapted to be moved into and out of communication with supply passage 8 in extension 2, thus providing three fully open or on positions and a closed or off position. An axial passage or bore 9 in the plug places the transverse passages 5, 6 and 7 in communication with the axial outlet passage 10 in the casing. The reduced flow passages 6 and 7 lead from depressions or recesses 30 and 31 equal in size to and in a common plane with the full flow passage 5.

The valve plug 3 is confined within the valve casing 1 by means of a cap member 11, having a central opening 12 through which the stem 13 of the valve extends. A heavy expansion coil spring 14 bears at one end against the valve plug and at its other end against a washer 15 to resiliently hold the valve plug in the bore 4 and the washer against the cap 11, as shown in Figure 1 of the drawing. The washer 15 is slidably mounted upon and guided by the angular stem 13 for rotation with the valve plug and is formed with radially and oppositely disposed offset portions or ribs 17 adapted for resilient engagement with corresponding radially extending depressions or slots 18 in a combined stop and latch member 50 so as to latch the valve in its several positions and to indicate to the operator by a clicking sound when movement of the valve from one flow position to another has been effected. These several positions of the valve are indicated visually on the panel P in Figure 13.

The stem 13 is formed with a straight wall or flat portion 51, which is slidably engaged by a corresponding straight wall 52 on the washer 15 thus locking the washer against relative rotation with respect to the valve plug and its stem but leaving the same free to move axially into and out of locking engagement with the depressions or slots 18, in the latch and stop member 50. An arcuate flange 33, extending inwardly from the periphery of the latch and stop member 50, fits snugly into a correspondingly shaped gap or cut out portion 35 in the outer threaded extension 36 of the casing, and is held therein by the cap 11 when the latter is screwed home on the threaded extension 36, thus anchoring the lock and latch member to the casing. The member 50 is also formed with two shoulders 53 and 54, respectively formed in opposite edges of the arcuate flange 33, which are engaged by a stop lug 55 on the periphery of washer 15, for positively limiting rotation of the valve plug, the latter being provided with an operating handle 56.

The outlet end of the casing 1 has an orifice hood 19 in screw threaded engagement with the reduced threaded outlet end portion thereof, the hood having a discharge outlet or orifice 20 with which a needle point or valve 21, fixed to or integrally formed with outlet end of the casing 1, cooperates. A tubular insert member 22 having a press fit in a socket or seat 27 in the inner end of axial plug passage 9, is formed with spaced elongated longitudinally disposed rectangular slots 23 and 24 respectively, opening through the inner peripheral edge of the insert for a purpose presently understood. The low and medium flow restricted inclined inlet passages 6 and 7 respectively, preferably correspond in size with and are spaced apart similarly to and communicate at their inner ends with these slots 23 and 24, which in turn place the inclined passages in communication with the passage 9, the flow being upwardly and inwardly to and through the slots 23 and 24 and thence outwardly through the cylindrical bore of the member 22 to passage 9 and finally out through outlet orifice 20. The extent of this flow is controlled by means of a partially threaded elongated throttle valve 25 mounted in an axial partially threaded bore 26 formed in the valve stem 13 and communicating with the interior of the open ended insert or sleeve 22. The inner unthreaded portion of the bore 26 is of the same size and axially aligned with the bore of the insert, the latter being adapted to snugly receive the smooth cylindrical outer blunt end of the throttle valve when the latter is screwed home in an obvious manner. Inward movement of the valve 25, causes the valve to overlie and of course cut down the effective area of the narrow slots 23 and 24 in the insert member 22, and movement in an opposite direction progressively uncovers the slots with reverse effect. It will also be seen that when adjustment is made the flow in either flow position of the plug valve is accurately proportional to the flow which occurred in either position before such adjustment was made. Adjustment of the throttle valve is made by engaging the slot in the threaded end thereof with a suitable tool.

When the valve structure is installed on a gas range or the like the hood 19 will be set with respect to the outlet needle valve or point 21 so as to establish an orifice 20 corresponding to the "High" position of the valve plug, at which time maximum flow is obtained through supply passage 8, large inlet opening 5 direct to plug bore 9 and thence out through orifice 20 to the burner, not shown. Thereafter there will be no adjustment of the hood which thus remains in a fixed position. The inclined inlet passages 6 and 7, which lead from gas receiving recesses 30 and 31 in the valve plug, are much smaller than the inlet opening 5, and inlet passage 7 has approximately twice the capacity of passage 6 so that these respective passages when brought into register with supply passage 8 will accommodate sufficient gas to support a "Low" and "Medium" burner flame respectively, on all kinds of gases. The operator also generally finds it necessary, when installing the range, to adjust the throttle valve 25 so as to procure the desired accurate reduced flows, according to the kind and quality of gas being used in the particular locality in which the installation is made, and of course depending upon the nature of the burner being serviced. As previously indicated this fine adjustment is effected by means of the throttle valve 25. Thereafter, when it becomes necessary to make further adjustments in the reduced flame positions or flows these adjustments can be made simultaneously and without disturbing the predetermined relationship of the "Low" flow to the "Medium" flow and vice versa. This is important because independent adjustment is very likely to result either in too great or too small a flow in one reduced flow position with respect to the other, with the danger that movement of the inlet plug valve to a certain reduced flow position, as indicated on the panel, will not result in the flame characteristics expected and desired for the particular kind of cooking or heating under consideration. While I have shown only two reduced flow positions, it will be obvious that the proportional adjustment means shown herein is adapted for use with a valve having additional reduced flow positions.

It may be noted here that with the handle 56 occupying the position marked "Off" there will be no flow of gas through the valve; but when the handle is turned in a clockwise direction from "Off" to "High" and thence to "Low" and finally to "Medium" in steps of approximately ninety degrees; or in a reverse direction from "Medium" to "Low" and "High" in the order named, the supply passage 8 will register with the respective inlet orifices in the plug valve and the appropriate volume of gas will flow through the valve. There is a dead area of approximately ninety degrees between the "Off" and "Medium" flow position direct to "Off" or from "Off" to "Medium." Stop shoulders 53 and 54 on the latch and stop member 50, are engaged by the stop lug 55 on washer 15, in the "Medium" and "Off" positions respectively.

From Figures 1, 2 and 3 it will be seen that except when the valve 3 is closed, there will be permitted a flow of gas through the valve structure because of the relatively large size of the recesses 30 and 31 and the inlet 8 as compared with the two smaller closed portions adjacent thereto. Thus the gas will not be shut off while turning the valve between the "High," "Low" and "Medium" positions, but the only time when the gas will be completely shut off will be when the valve occupies "Off" position.

In Figure 9 I have shown a modified form of proportional control means wherein the sleeve 22 is provided with two rows 28 and 29 of accurately alined and oppositely disposed perforations 28' and 29' in lieu of the narrow slots 23 and 24. The perforations 28' which replace the smaller slot 23 are approximately half the area of perforations 29' which replace the larger or medium flow slot 24. The inner ends of inclined passages register with and span the respective rows of perforations. Proportional adjustment is made as in the preferred form of my invention, that is, movement of the needle valve 25, causes the latter to progressively cover or uncover the openings 28' and 29' of each row according to the direction in which the valve is rotated.

It should also be noted that the usual troublesome needle valve means of adjustment, which frequently becomes gummed or clogged, is now entirely eliminated by the use of throttle valve 25.

Having thus described my invention, what I claim is:

1. A valve structure comprising a casing having an inlet supply passage and an outlet passage, an inlet valve in said casing having a fully open and a plurality of reduced flow positions, said inlet valve having a plurality of inlet passages, one for each of said flow positions and adapted to be brought into and out of communication with said supply passage and outlet passage, a hollow insert member in said inlet valve communicating with said outlet passage, said insert having a plurality of slots one each for and communicating with the inlet passages for said reduced flow positions and with the interior of said hollow insert, and a throttle valve movable in said insert for proportionately opening and closing said slots to simultaneously and proportionately adjust the flow through two or more of said inlet passages.

2. A valve structure comprising a casing having an inlet supply passage and an outlet passage, an inlet valve in said casing having a fully open and a plurality of reduced flow positions, said inlet valve having a plurality of inlet passages, one for each of said flow positions and adapted to be brought into and out of communication with said supply passage and outlet passage, a hollow insert member in said inlet valve communicating with said outlet passage, said insert having a plurality of slots one each for and communicating with the inlet passages for said reduced flow positions and with the interior of said hollow insert, and a throttle valve movable in said insert for proportionately opening and closing said slots to proportionately adjust the flow through two or more of said inlet passages.

3. A valve structure comprising a casing having an inlet passage and an outlet passage, an inlet valve in said casing having a fully open and a plurality of reduced flow positions, said inlet valve having a plurality of inlet passages, one for each of said flow positions and adapted to be moved into and out of communication with said supply passage and outlet passage, a hollow member mounted in said inlet valve and communicating with said outlet passage, the wall of said hollow member having a plurality of passages therein communicating with the inlet passages for said reduced flow positions and with the interior of said hollow member, and a valve member cooperating with said hollow member for proportionately opening and closing said passages in said hollow member to proportionately adjust the relative flow through two or more of said last named inlet passages.

4. A valve structure comprising a casing having an inlet passage and an outlet passage, a rotatable inlet valve plug in said casing having a fully open and a plurality of reduced flow positions, said inlet valve having a plurality of inlet passages, one for each of said flow positions and adapted to be rotated into and out of communication with said supply passage and outlet passage, a hollow member mounted in and rotatable with said inlet valve and communicating with said outlet passage, the wall of said hollow member having a plurality of passages therein communicating with the inlet passages for said reduced flow positions and with the interior of said hollow member, and a valve member cooperating with said hollow member for approximately proportionately opening and closing said passages in said hollow member to approximately proportionately adjust the relative flow through two or more of said last named inlet passages.

5. A valve structure comprising a casing having an inlet supply passage and an outlet passage, an inlet valve in said casing having a fully open and a plurality of reduced flow positions, said inlet valve having a plurality of inlet passages, one for each of said flow positions and adapted to be brought into and out of communication with said supply passage and outlet passage, a hollow insert member in said inlet valve communicating with said outlet passage, said insert having a plurality of rectangular slots one each for and communicating with the inlet passages for said reduced flow positions and with the interior of said hollow insert, and a throttle valve movable in said insert for proportionately opening and closing said slots to proportionately adjust the flow through two or more of said inlet passages.

6. A valve structure comprising a casing having an inlet supply passage and an outlet passage, an inlet valve in said casing having a fully open and a plurality of reduced flow positions, said inlet valve having a plurality of inlet passages, one for each of said flow positions and adapted to be brought into and out of communication with said supply passage and outlet passage, a hollow insert member in said inlet valve communicating with said outlet passage, said insert having a plurality of slots one each for and communicating with the inlet passages for said reduced flow positions and with the interior of said hollow insert, and a throttle valve movable in said insert for opening and closing said slots to simultaneously adjust the flow through two or more of said inlet passages.

7. A valve structure comprising a casing having an inlet supply passage and an outlet passage, an inlet valve in said casing having a fully open and a plurality of reduced flow positions, said inlet valve having a plurality of inlet passages, one for each of said flow positions and adapted to be brought into and out of communication with said supply passage and outlet passage, a member associated with said inlet valve, said member having a plurality of passages one each for and communicating with the inlet passages for said reduced flow positions and with said outlet passage and a throttle valve for proportionately opening and closing said plurality of passages in said member to simultaneously and proportionately adjust the flow through two or more of said inlet passages.

LAWRENCE JAROS.